Oct. 30, 1962   R. E. PLOUCK ETAL   3,060,757
REVERSING LINKAGE FOR PRONY BRAKE APPARATUS
Filed Aug. 1, 1960   2 Sheets-Sheet 1
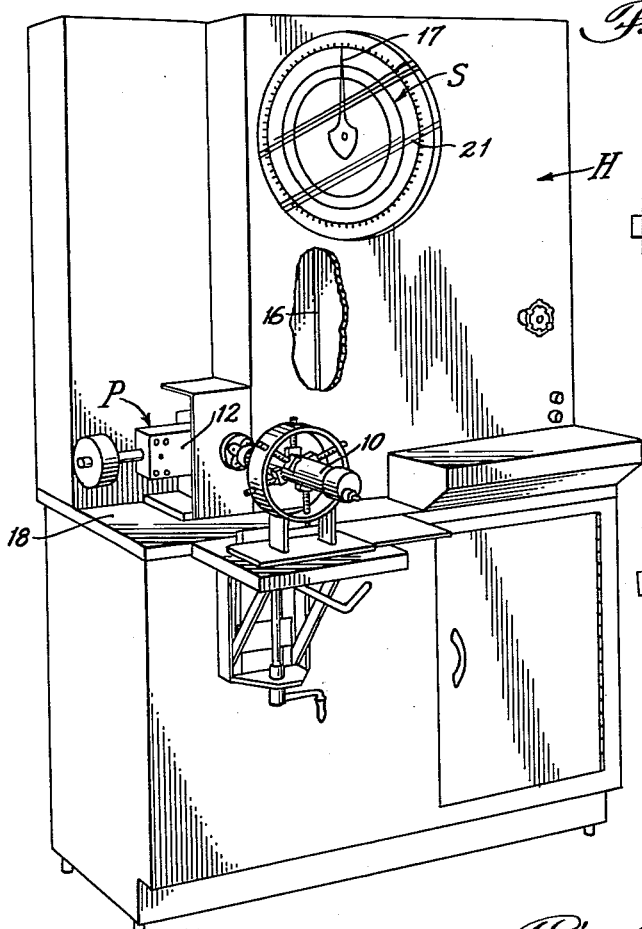
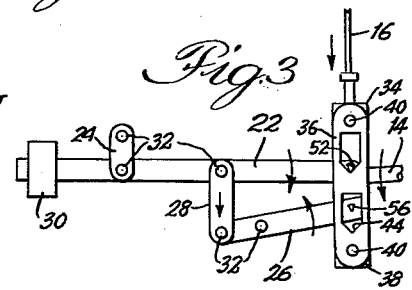
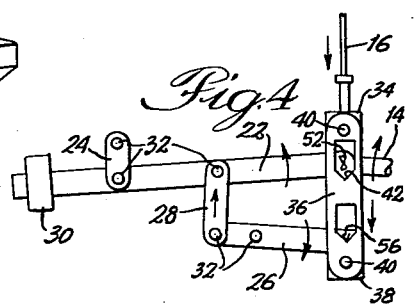
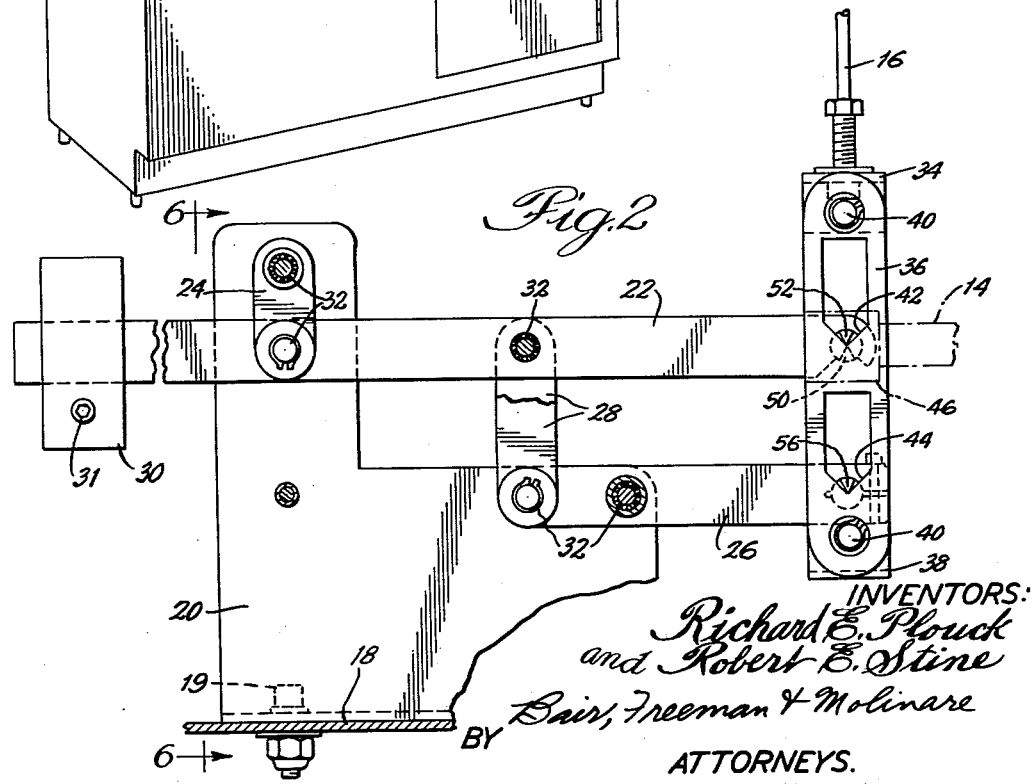
INVENTORS:
Richard E. Plouck
and Robert E. Stine
BY Bair, Freeman & Molinare
ATTORNEYS.

Oct. 30, 1962 — R. E. PLOUCK ETAL — 3,060,757
REVERSING LINKAGE FOR PRONY BRAKE APPARATUS
Filed Aug. 1, 1960 — 2 Sheets-Sheet 2
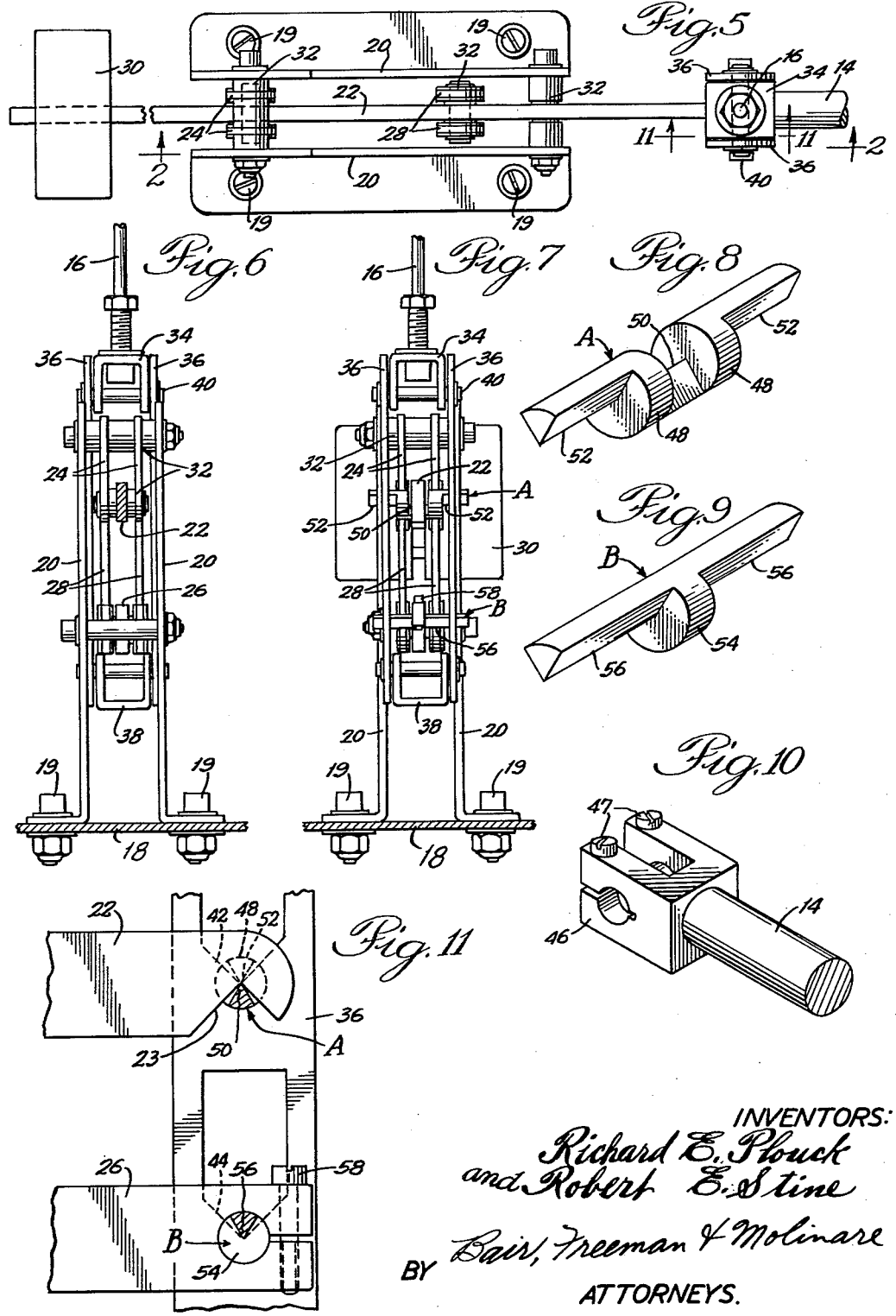

United States Patent Office 3,060,757
Patented Oct. 30, 1962

3,060,757
REVERSING LINKAGE FOR PRONY BRAKE APPARATUS
Richard E. Plouck, Bryan, and Robert E. Stine, Montpelier, Ohio, assignors to The Aro Corporation, a corporation of Ohio
Filed Aug. 1, 1960, Ser. No. 46,819
6 Claims. (Cl. 74—101)

This invention relates to reversing linkage for a prony brake apparatus, which linkage operates to translate torque applied to the prony brake apparatus in either direction of rotation to a pull directed in a single direction so that such pull can be measured on a scale or the like which scale accordingly indicates the pull regardless of the direction of rotation of the torque receiving shaft of the prony brake apparatus.

One object of the invention is to provide reversing linkage which is comparatively simple and inexpensive to manufacture and which can be interposed between any type of a prony brake apparatus and a scale for measuring the pull resulting from torque applied to the apparatus, one such apparatus suitable for this purpose being shown in the copending application of Hitt and Stine, Serial No. 46,818, filed August 1, 1960.

Still another object is to provide reversing linkage comprising primary and secondary pivoted levers linked together in such a way that pull points on the levers move simultaneously in opposite directions, and a yoke connection to the pull points which is moved by only one pull point at a time independent of the other pull point so that the yoke connection is always moved in the same direction whether the pull points approach or recede relative to each other.

With these and other objects in view, our invention consists in the construction, arrangement and combination of the various parts of our reversing linkage for prony brake apparatus, whereby the objects above contemplated are attained, as hereinafter more fully set forth, pointed out in our claims and illustrated in detail on the accompanying drawings, wherein:

FIG. 1 is a perspective view of a prony brake apparatus and a cabinet therefor in which our reversing linkage for the apparatus is contained;

FIG. 2 is a part side elevation and part sectional view of our reversing linkage;

FIGS. 3 and 4 are diagrammatic views showing different operations thereof;

FIG. 5 is a plan view of FIG. 2, FIG. 2 being taken on the line 2—2 thereof;

FIG. 6 is an end view of the left hand end of FIG. 2;

FIG. 7 is an end view of the right hand end of FIG. 2;

FIGS. 8 and 9 are perspective views of knife edge elements used in our reversing linkage;

FIG. 10 is a perspective view of a brake arm extension yoke for connecting a prony brake apparatus to our reversing linkage; and FIG. 11 is a vertical sectional view on the line 11—11 of FIG. 5 showing the cooperation between the knife edge elements and other elements of our linkage.

On the accompanying drawing we have used the reference character H to indicate a housing for a prony brake apparatus P and for our reversing linkage shown in FIGS. 2 to 11. The reference numeral 10 indicates a power source such as a pneumatic motor or the like being torque-analyzed on the prony brake P. The prony brake shown generally at P is disclosed in detail in the copending application hereinbefore referred to and includes a brake arm 12 operated by the torque applied to the prony brake. The arm 12 in turn is operable to depress a control rod 16 extending to a scale S. Such control rod is operatively connected to an indicating pointer 17 which cooperates with a scale or dial 21 of the scale S to indicate the pull on the rod 16 produced by the arm 12.

A table 18 is shown and serves as a support for the prony brake P and for our reversing linkage. As shown in FIGS. 2, 6 and 7 the linkage includes side plates 20 which are secured as by bolts 19 to the table 18.

The reversing linkage includes a primary lever 22 suspended by links 24 from the side plates 20 and a secondary lever 26 connected by links 28 to the primary lever 22. The levers are single and the links are in pairs to balance the pull on the parts and prevent undesirable binding as obviously such would produce inaccuracies of measurement. To further reduce the possibility of such inaccuracies five pivots indicated at 32 in FIG. 2 are provided as connections between the side plates 20, the levers 22 and 26, and the links 24 and 28 as obvious from an inspection of FIG. 2. These pivots are preferably of needle bearing type so that they are substantially frictionless. Also the parts should be in static balance and this is accomplished by a counterweight 30 adjustable along the primary arm 22 and locked in position when balance is attained by a clamp screw 31.

The control rod 16 is connected to an extension rod 14 from the brake arm 12 and to the reversing linkage by means of a top yoke 34 and a pair of side plates 36. In FIG. 1 the extension 14 would extend from the right hand end of the brake arm 12 whereas in FIG. 2 it extends toward the left. The reversing linkage shown in FIG. 2 is therefore seen as viewed from the back of the housing H. The top ends of the side plates 36 are connected together by the yoke 34. A similar bottom yoke 38 and pair of pivot pins 40 connect the lower ends of the side plates 36 together. Each side plate 36 is provided with an upper V seat 42 and a lower V seat 44.

The brake arm extension 14 terminates in a brake arm extension yoke 46 as shown in FIG. 10 provided with clamp screws 46 and the arms of this yoke surround lands 48 of a knife edge element A shown in FIG. 8. The knife edge element is thereby supported by the yoke 46. The element A has a central upwardly pointing knife edge 50 and two end knife edges 52 which point downwardly. The knife edge 50 coacts with a V seat 23 in the primary lever 22 as shown in FIG. 11 whereas the knife edges 52 coact with the V seat 42 of the side plates 36.

A knife edge element B has a land 54 clamped in the right hand end of the secondary lever 26 as shown in FIG. 11 by a clamp screw 58 and is provided with downwardly pointing knife edges 56 to coact with the V seat 44 of the side plates 36.

*Practical Operation*

In the operation of our reversing linkage, in the event the torque applied by the power source 10 to the brake arm 12 is clockwise it will depress the right hand end of the brake arm 12 and thus depress the extension 14 as indicated by the arrow in FIG. 3. This will likewise depress the primary lever 22 and its V seat 23 for pulling downward on the control rod 16. At this time the secondary lever 26 will move upwardly as indicated by the arrow and the knife edge 56 thereof will merely move upwardly away from the V seat 44 without affecting it in any way. Thus downward movement of the extension 14 produces downward movement of the control rod 16. During operation, the pendant character of the pivot for the primary lever 22 (links 24) permits the lever to seek a position that removes all endwise thrust tendencies acting thereon, thus securing maximum accuracy.

In the event the torque is applied counter-clockwise in FIG. 1, then the extension 14 will move upwardly as shown in FIG. 4 to depress the knife edge 56 and thus move the control rod 16 downwardly again, this time through the secondary lever 26 instead of through the primary lever 22. At the same time the knife edges 52 will move upwardly away from the V seat 42 of the side plates 36 without affecting the side plates in any way.

Thus regardless of whether the torque is applied clockwise or counterclockwise the pull on the control rod 16 will always be in the same direction for proper indication by the pointer 18 on the dial 20 of the scale S. An arrangement of this character makes it possible to always apply torque from the front of the housing H regardless of the direction of rotation whereas without our reversing linkage clockwise rotation would have to be applied from the front of the housing H and counterclockwise from the back of it. At the same time, the linkage automatically accomplishes its reversing function without any attention by the operator.

Some changes may be made in the construction and arrangement of the parts of our reversing linkage for prony brake apparatus without departing from the real spirit and purpose of our invention, and it is our intention to cover by our claims any modified forms of structure or use of mechanical equivalents which may reasonably be included within their scope.

We claim as our invention:

1. In a reversing linkage for a prony brake apparatus, a primary lever, a secondary lever, linkage connections between said levers to reverse the direction of one relative to the other, a control rod extending to an indicating device, an operative connection from said primary lever and a second operative connection from said secondary lever to said control rod to move it in only one direction by said primary lever independent of said secondary lever when said primary lever is pivoted in one direction, and to move it in said only one direction by said secondary lever independent of primary lever when said primary lever is moved in the opposite direction, said operative connections comprising an element for moving said control rod and having a pair of lost motion connections with said primary and secondary levers.

2. In a reversing linkage for a prony brake apparatus, a primary lever, a secondary lever, a support, said levers being pivoted to said support, linkage connections between said levers to reverse the direction of one relative to the other, a control rod extending to an indicating device, and operative connection means between said control rod and said primary and secondary levers comprising a pair of one-way acting knife edges and V-seats, one of which acts in one direction on said primary lever and has lost motion in the opposite direction, and the other of which acts in said one direction on said secondary lever and has lost motion in said opposite direction.

3. In a reversing linkage for a prony brake apparatus, a primary lever, a secondary lever, a support, said levers being pivoted to said support linkage connections between said levers to reverse the direction of one relative to the other, a control rod extending to an indicating device, and operative connection means between said control rod and said primary and secondary levers comprising a plate having a pair of openings therein, each of said levers having a projection, one lever projection extending into one of said openings and the other lever projection extending into the other of said openings, said projections being located on said levers for simultaneous movement apart or toward each other and being smaller in size than said openings to permit one projection to move said plate independent of the other projection.

4. Reversing linkage of the character disclosed comprising a support, a primary lever and a secondary lever, said levers being pivoted to said support, a link connection between said levers to effect movement of one of said levers in one direction when the other moves in the opposite direction, a control rod, knife edge connections between said control rod and each of said levers, one of said knife edge connections being operable in one direction only and freely movable in the opposite direction with respect to said control rod, the other of said knife edge connections being operable in said one direction only and freely movable in said opposite direction with respect to said control rod whereby movement of said primary lever in one direction actuates said control rod in one control direction, and movement thereof in the opposite direction causes said secondary lever to operate said control rod in the same control direction.

5. Reversing linkage of the character disclosed comprising a support, primary and secondary levers pivoted thereto, link connections between said levers to cause upward movement of one lever at a point spaced from its pivot and downward movement of a point on the other lever spaced from its pivot, and a control rod having a zero position and movable in one control direction therefrom, said control rod being connected with said points by lost motion connections whereby it is operated by them selectively, and only by the point that moves in said one control direction.

6. Reversing linkage of the character disclosed comprising a support, a primary lever and a secondary lever, said primary lever being link-pivoted at one of its ends to said support, a control rod connected with said primary lever's opposite end, said secondary lever being pivoted to said suport intermediate its ends and having one of its ends connected with said control rod, a link connection between the other end of said secondary lever and said primary lever intermediate its ends, said control rod connections to said levers being of engagement type in one direction only and free of engagement in the opposite direction whereby said control rod is operable by only one of said levers at a time.

References Cited in the file of this patent

UNITED STATES PATENTS 2,130,900  Presbrey _____ Sept. 20, 1938

FOREIGN PATENTS 837,742  Germany _____ May 2, 1952